(12) United States Patent
Finch, Jr. et al.

(10) Patent No.: US 8,985,285 B2
(45) Date of Patent: Mar. 24, 2015

(54) RAILWAY VEHICLE BRAKE DISC

(75) Inventors: Glyn A. Finch, Jr., Simpsonville, SC (US); Peter D. Mathern, Greenville, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 505 days.

(21) Appl. No.: 12/956,108

(22) Filed: Nov. 30, 2010

(65) Prior Publication Data

US 2011/0127125 A1 Jun. 2, 2011

Related U.S. Application Data

(60) Provisional application No. 61/265,009, filed on Nov. 30, 2009.

(51) Int. Cl.
| F16D 65/12 | (2006.01) |
| B61H 5/00 | (2006.01) |
| F16D 65/02 | (2006.01) |

(52) U.S. Cl.
CPC .............. F16D 65/124 (2013.01); B61H 5/00 (2013.01); F16D 65/123 (2013.01); F16D 2065/1316 (2013.01)
USPC ................. 188/218 XL; 188/18 A; 188/264 A

(58) Field of Classification Search
CPC ......... B60T 1/06; F16D 65/12; F16D 65/123; F16D 65/124; F16D 65/128
USPC ........ 188/218 XL, 17, 18 A, 264 A, 264 AA, 188/264 G, 264 R
See application file for complete search history.

(56) References Cited

U.S. PATENT DOCUMENTS

| 2,243,334 | A | * | 5/1941 | Eksergian | 188/218 XL |
| 2,603,316 | A | * | 7/1952 | Pierce | 188/218 XL |
| 4,002,227 | A | * | 1/1977 | Simon | 188/218 XL |
| 4,501,346 | A | * | 2/1985 | Bogenschutz | 188/218 XL |
| 4,638,891 | A | | 1/1987 | Wirth | |
| 5,109,960 | A | * | 5/1992 | Gunther | 188/218 XL |
| 5,788,026 | A | | 8/1998 | Poli | |
| 5,823,303 | A | * | 10/1998 | Schwarz et al. | 188/218 XL |
| 6,164,423 | A | * | 12/2000 | Dickerson | 188/218 XL |
| 6,631,791 | B2 | * | 10/2003 | Moore et al. | 188/1.11 W |

(Continued)

FOREIGN PATENT DOCUMENTS

| DE | 4210449 A1 * | 10/1993 |
| EP | 0967407 A2 | 12/1999 |

(Continued)

*Primary Examiner* — Melanie Torres Williams
(74) *Attorney, Agent, or Firm* — The Webb Law Firm

(57) ABSTRACT

The railway vehicle brake disc includes a cylindrical hub, friction ring, and bell-shaped flange connecting the hub with the friction ring. The cylindrical hub defines a central axis and has an axial width and an outer diameter. The surface at the outer diameter defines an outer hub periphery. The friction ring includes two opposed annular members each having an outer braking surface and an inner surface. The annular members are connected to each other by a plurality of fins extending from the inner surface of one annular member to the inner surface of the other annular member. The bell-shaped flange has an inner portion connected to the hub, an outer portion connected to the fins, and a radial portion connecting the inner portion to the outer portion. The hub, friction ring, and bell-shaped flange are formed integrally from a single material.

20 Claims, 16 Drawing Sheets

(56) References Cited

U.S. PATENT DOCUMENTS

| | | |
|---|---|---|
| 6,808,050 B2 | 10/2004 | Lehmann et al. |
| 2004/0124045 A1 | 7/2004 | Mathern |
| 2005/0269173 A1* | 12/2005 | Tedesco et al. ......... 188/218 XL |
| 2006/0243547 A1* | 11/2006 | Keller .................... 188/218 XL |
| 2007/0181389 A1 | 8/2007 | Moore et al. |
| 2008/0060890 A1* | 3/2008 | Clark et al. ............. 188/218 XL |
| 2008/0073165 A1 | 3/2008 | Rau et al. |

FOREIGN PATENT DOCUMENTS

| | | |
|---|---|---|
| EP | 989321 A2 * | 3/2000 |
| GB | 2172676 A | 9/1986 |
| WO | 02081641 A1 | 10/2002 |

* cited by examiner

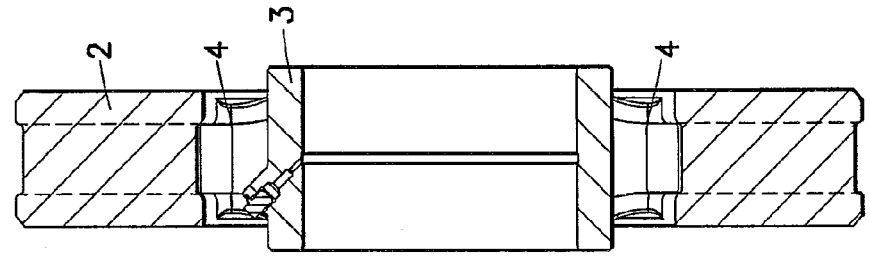
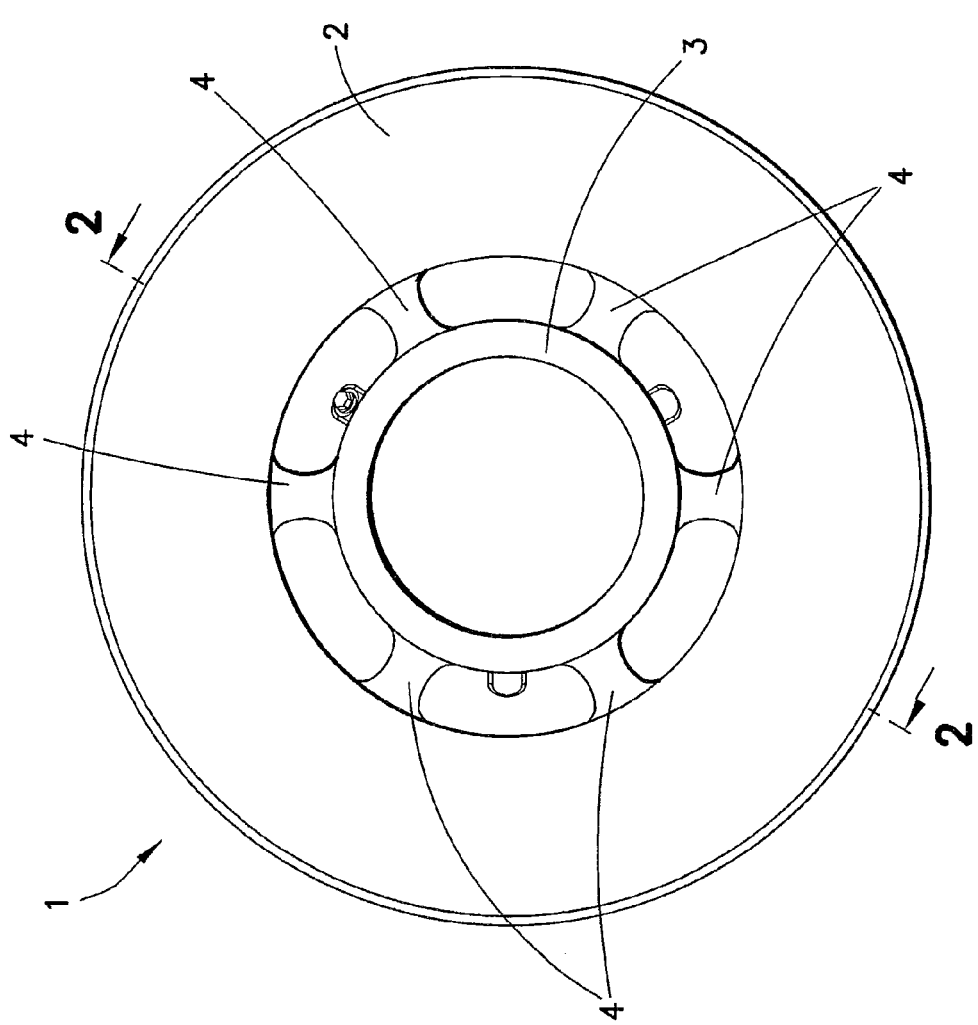

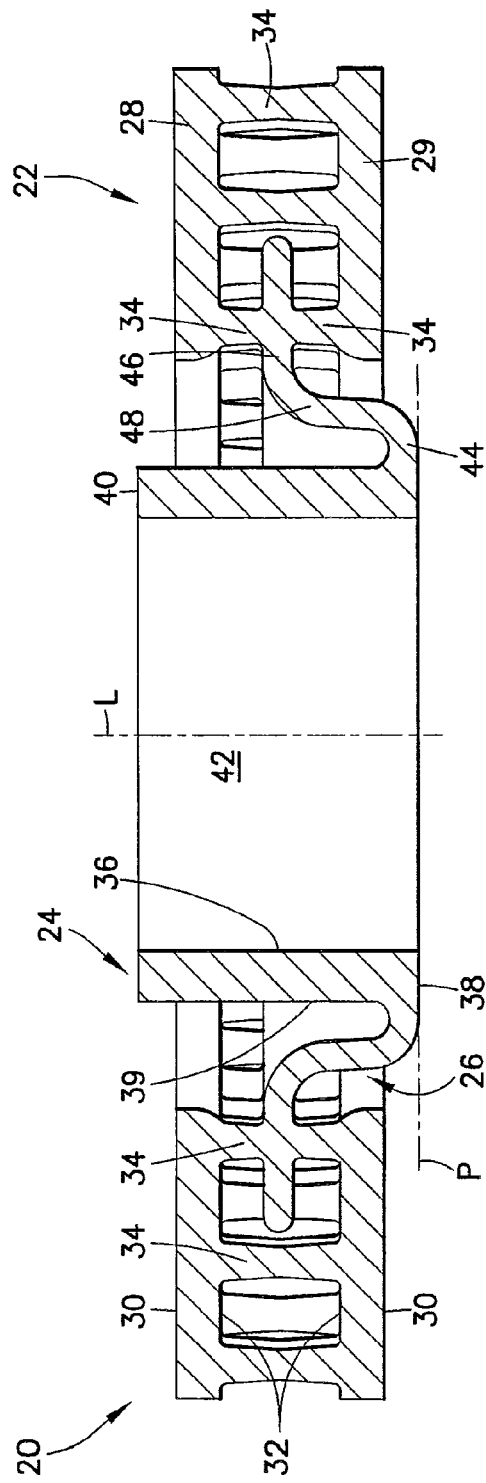
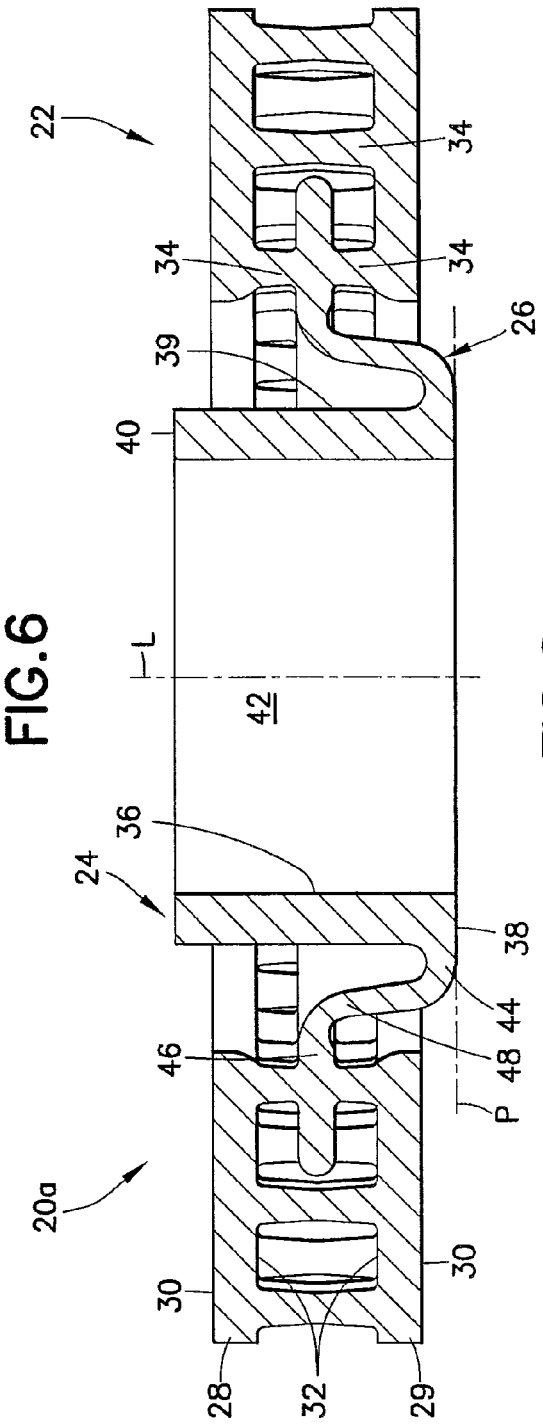

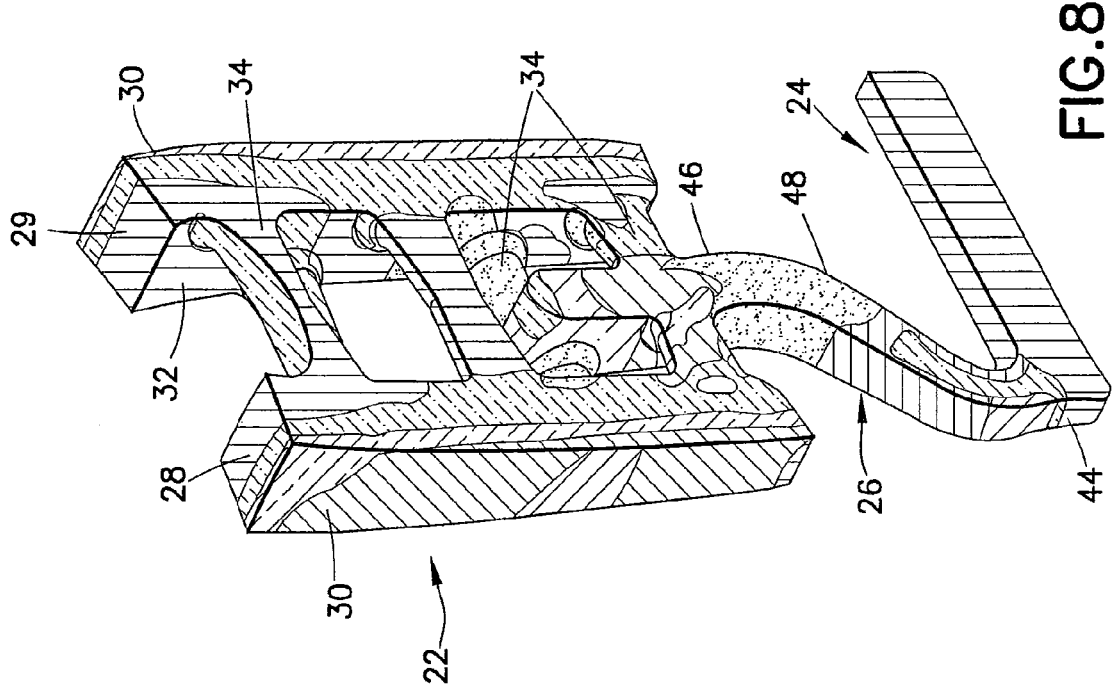
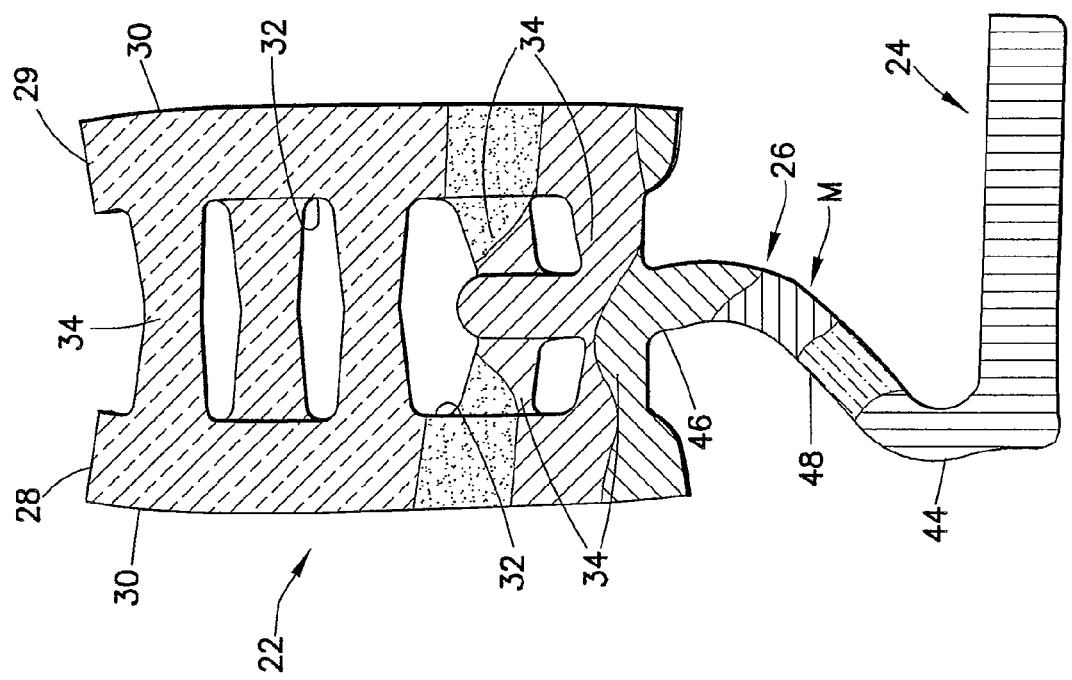

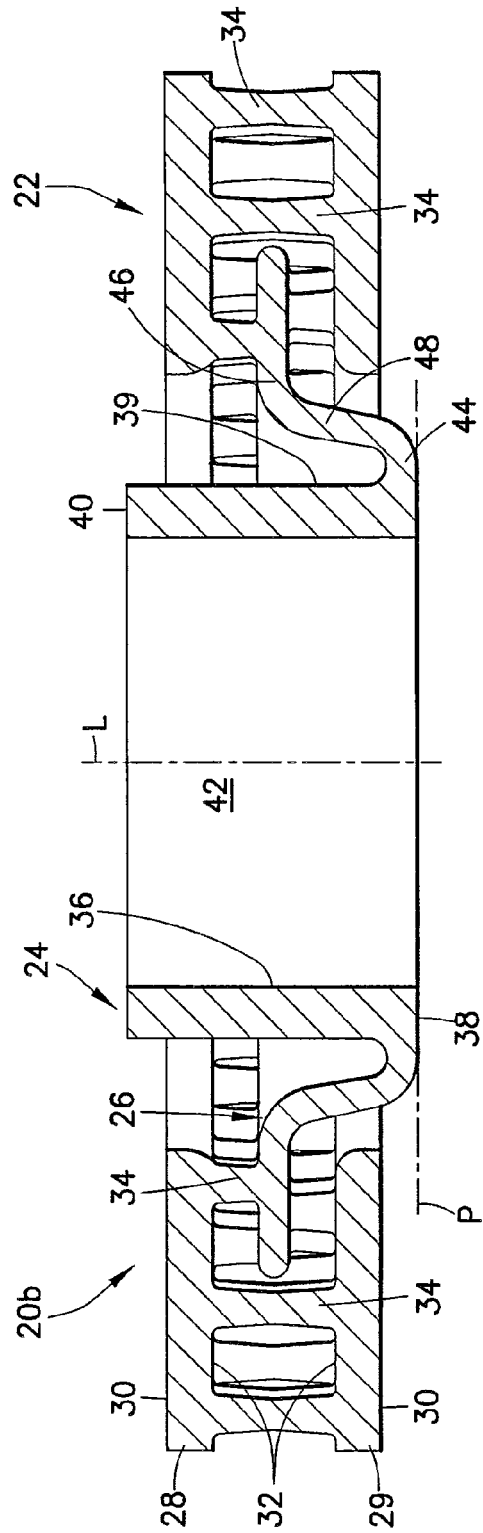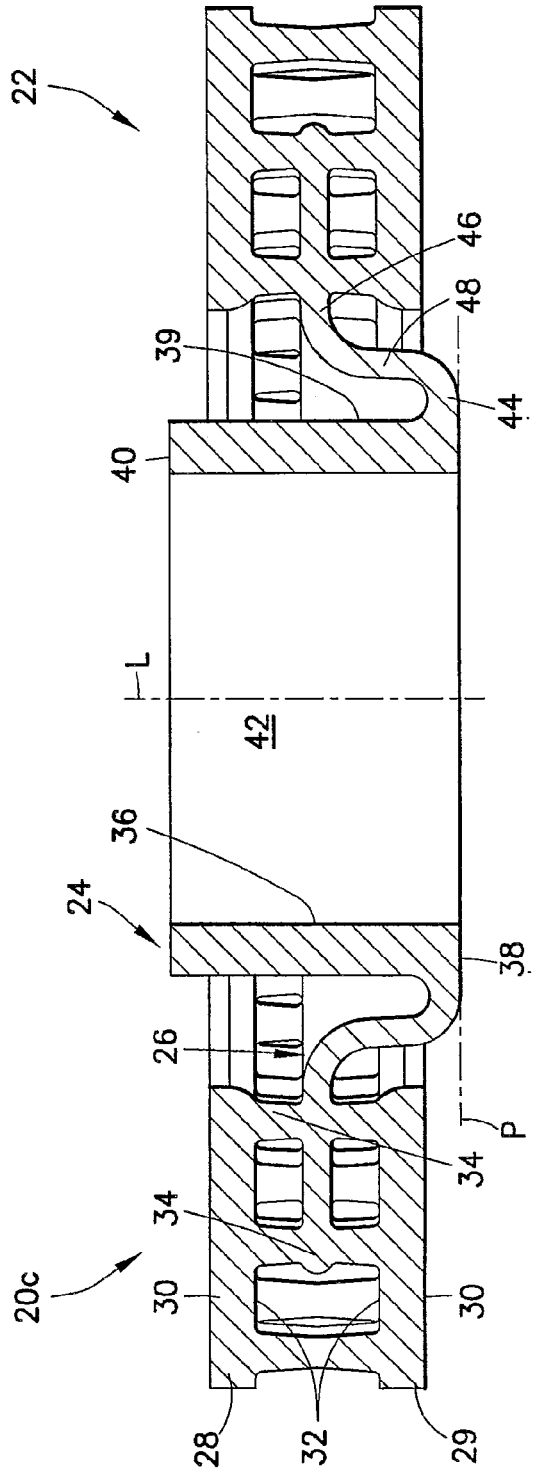

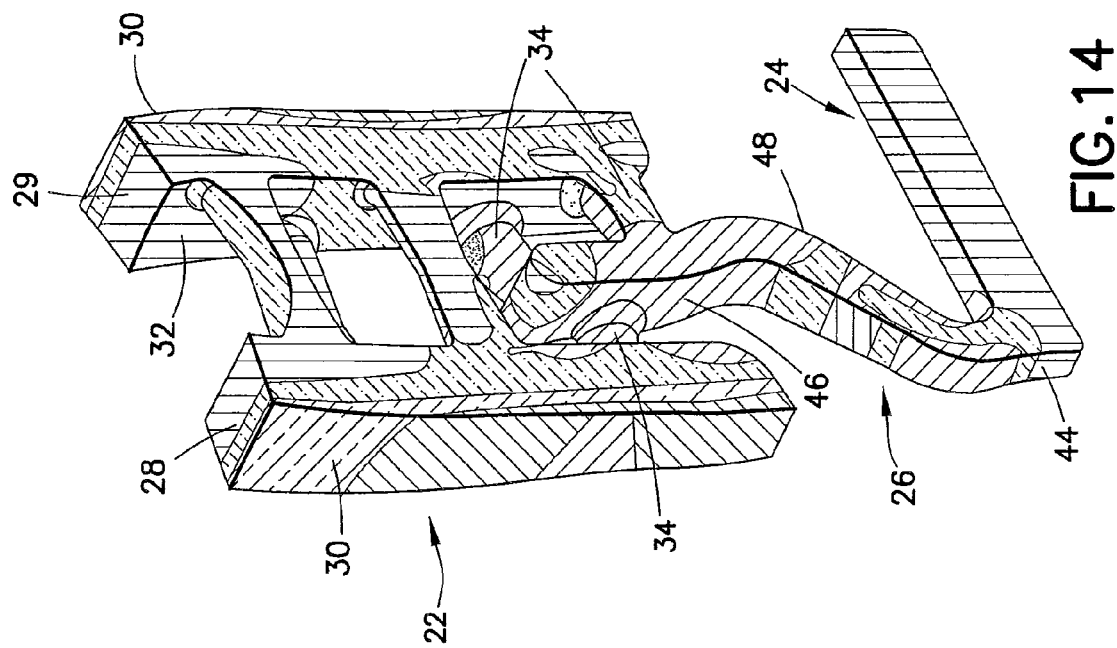
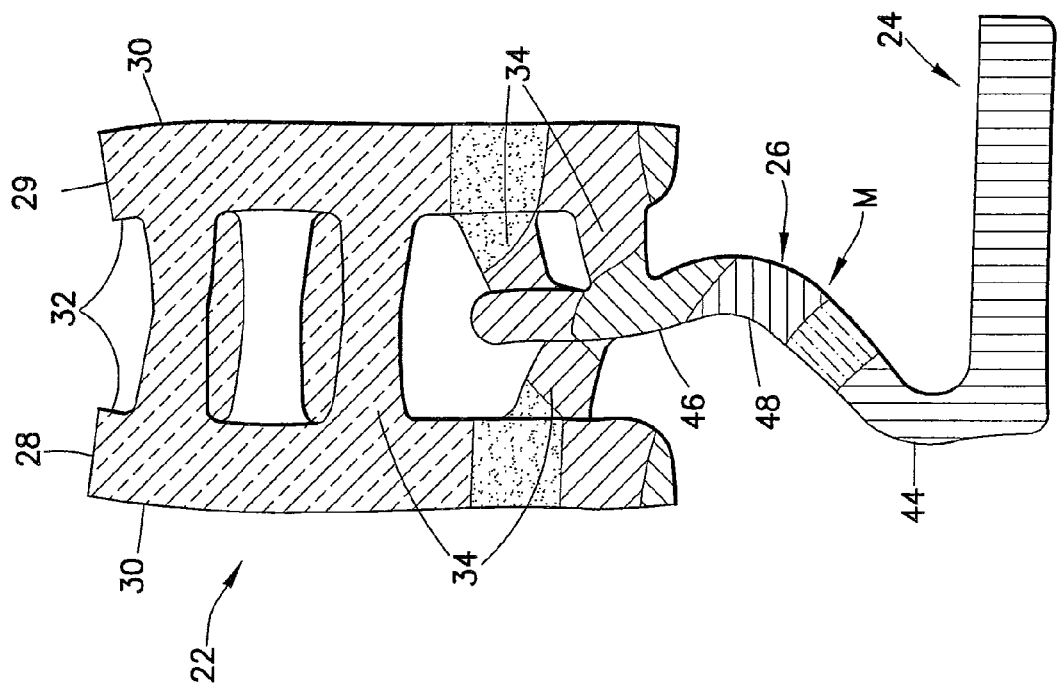

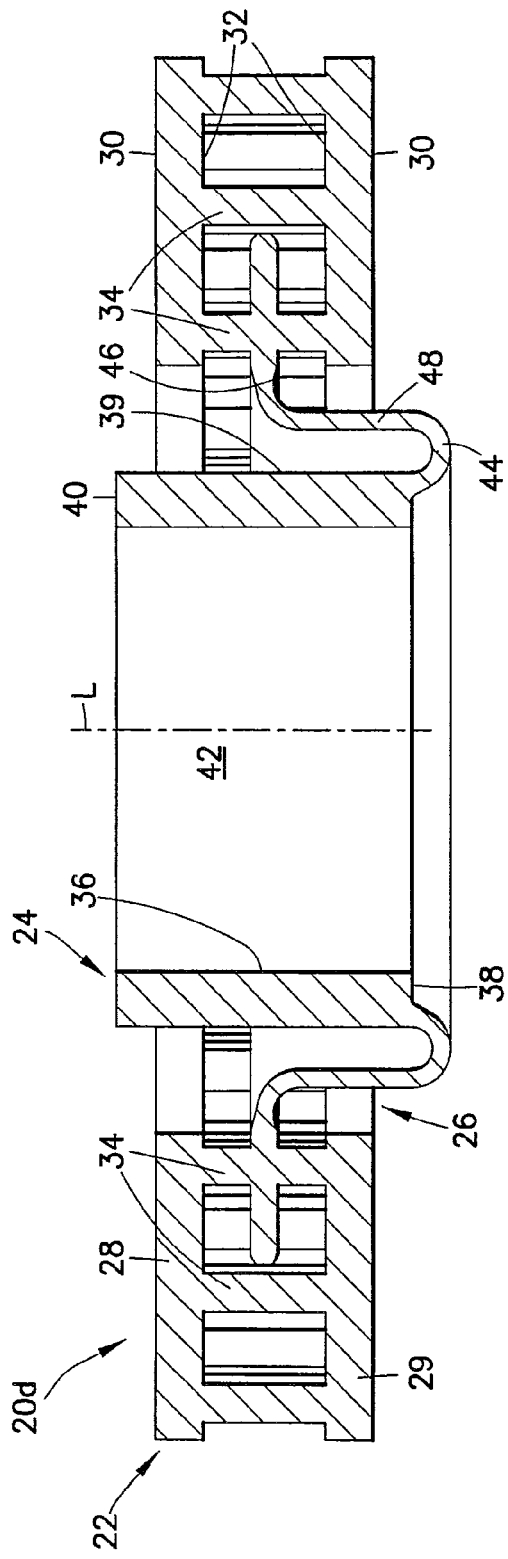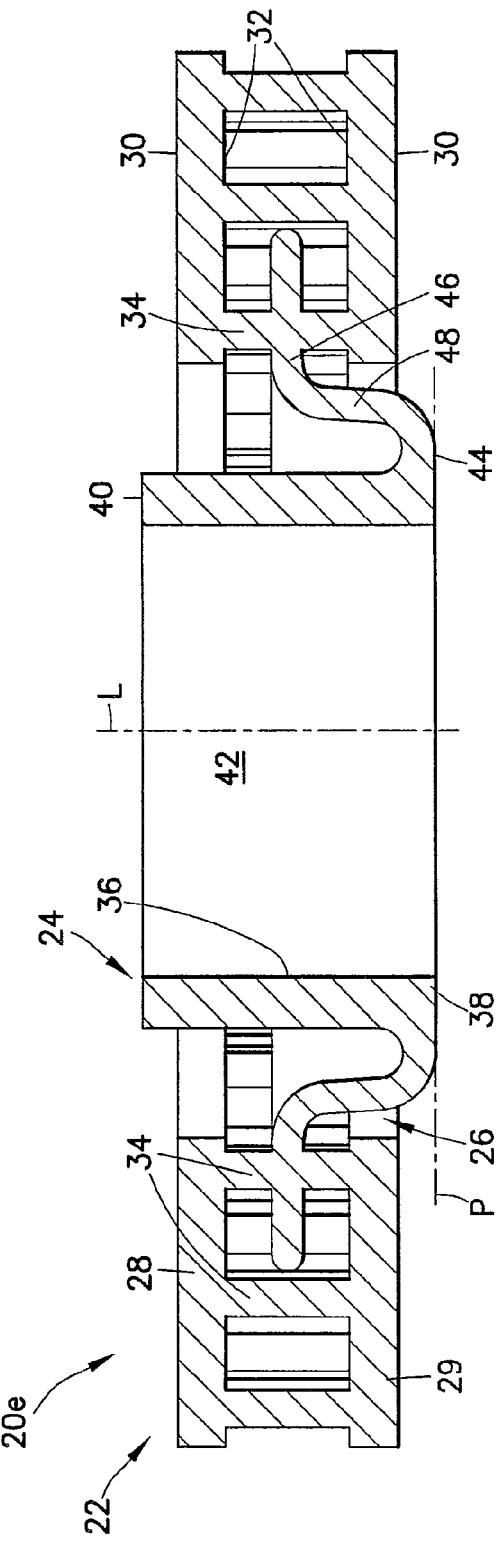

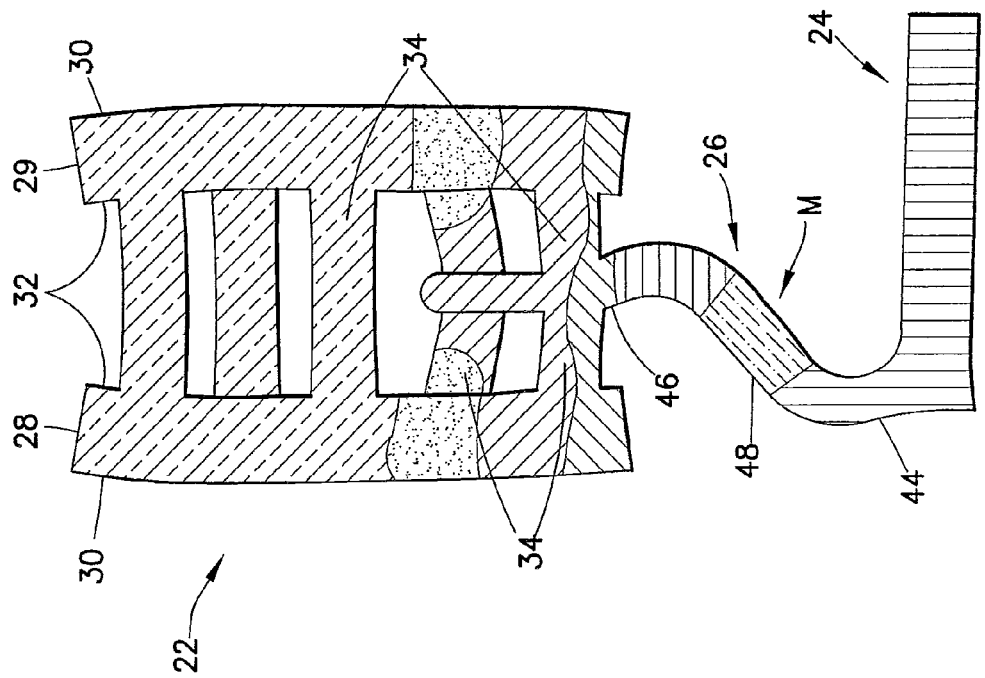
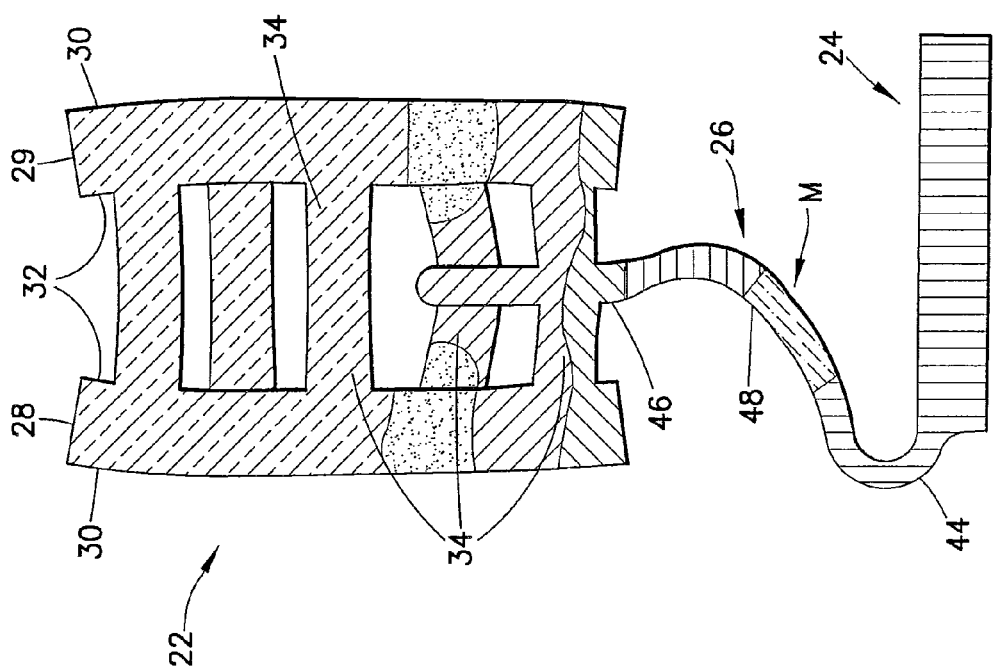

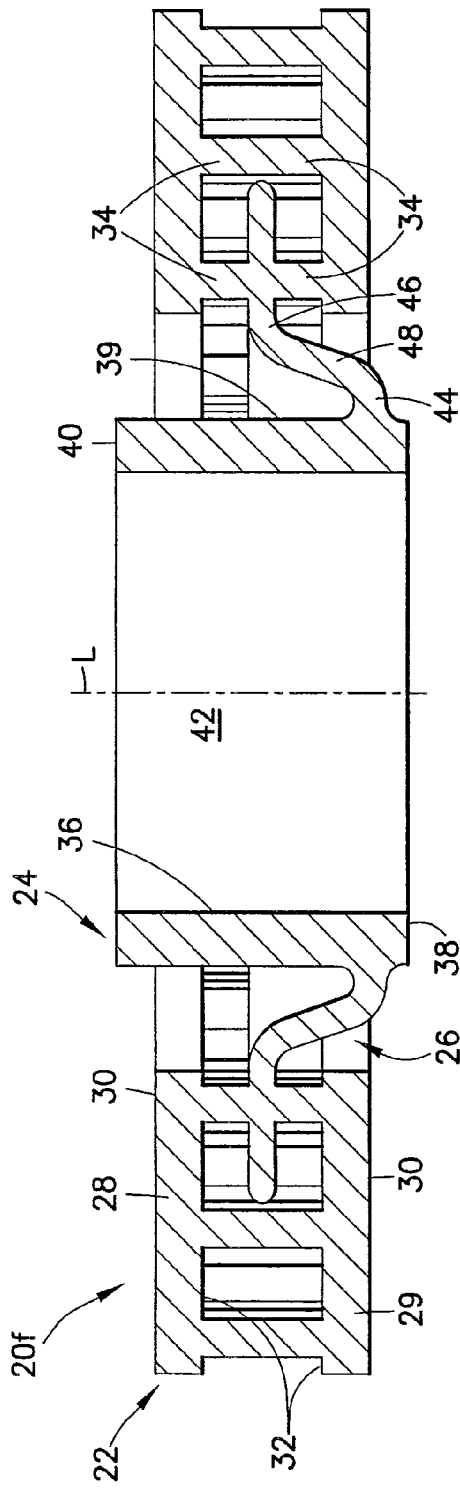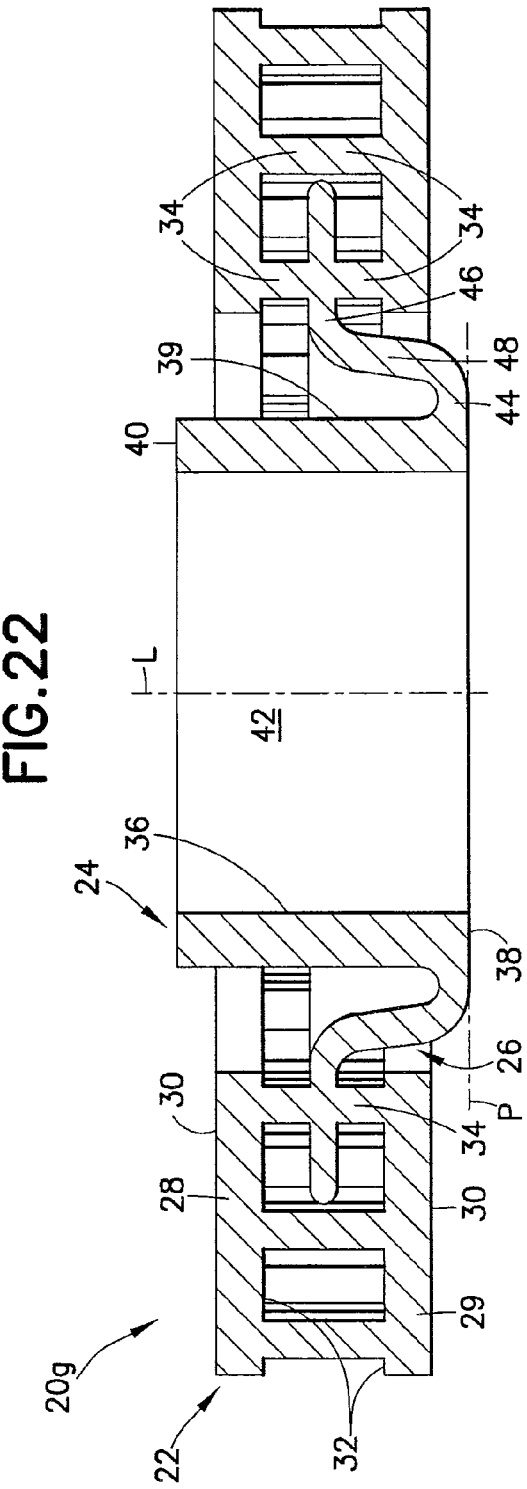

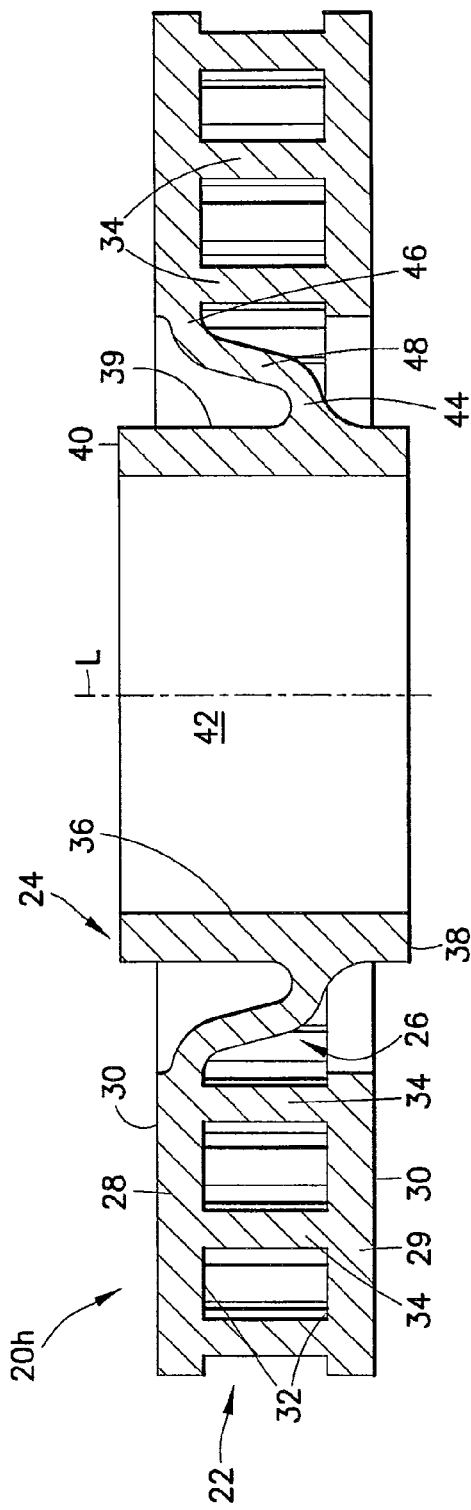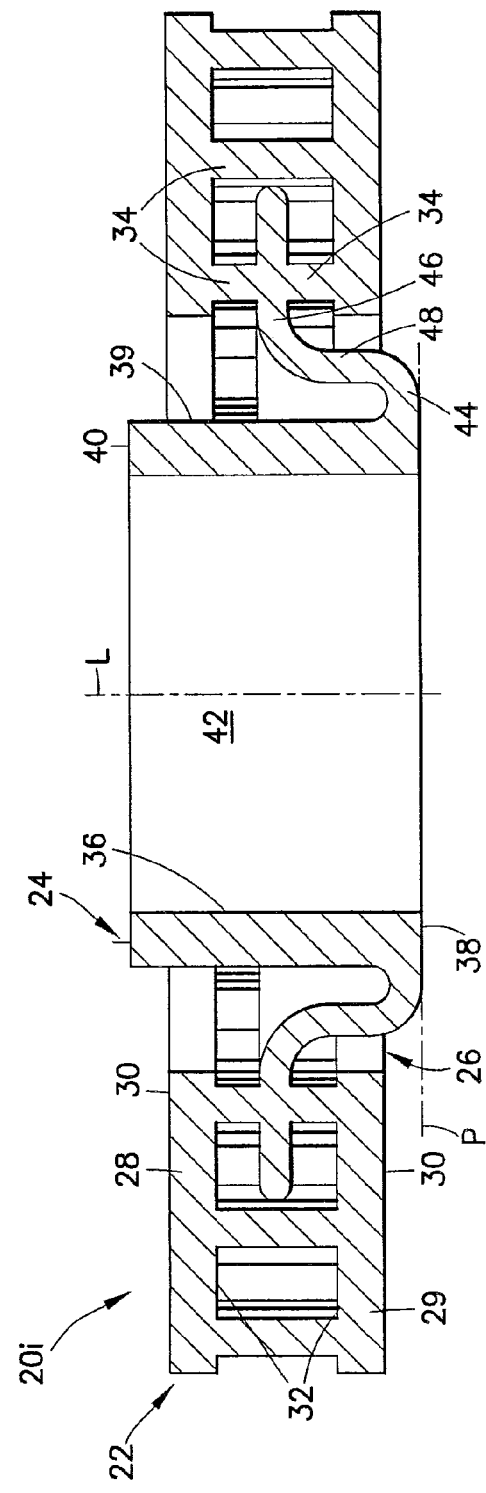

RAILWAY VEHICLE BRAKE DISC

CROSS REFERENCE TO RELATED APPLICATIONS

This application claims the benefit of U.S. Provisional Application No. 61/265,009, filed Nov. 30, 2009, the entire content of which is hereby incorporated by reference.

BACKGROUND OF THE INVENTION

1. Field of the Invention

The present invention relates to a railway vehicle brake disc and, further, to a monoblock brake disc having a hub and friction ring connected by a flange.

2. Description of Related Art

Brake discs for trains are typically pressed onto the axle or bolted to the wheel. Axle-mounted brake discs can be made from a single casting or may include a separate hub and friction ring that are bolted together, such as found in U.S. Pat. No. 6,808,050 to Lehmann et al. One-piece or monoblock brake discs typically incorporate radial spokes connecting the hub to the friction ring, such as found in U.S. Pat. No. 4,638,891 to Wirth. Heat generated during braking causes the friction ring to expand radially outward. In the two-piece brake disc design, the friction ring is generally allowed to expand relative to the hub as the disc heats up due to braking. This expansion is accommodated by the disc-hub connection.

Referring to FIGS. 1 and 2, a conventional one-piece brake disc 1 includes a friction ring 2 secured to a hub 3 by a plurality of spaced spokes 4. In this one-piece brake disc design, the spokes 4 that connect the friction ring to the hub 3 are stretched in tension as the friction ring heats up due to braking. The tension of the connecting spokes 4 during braking tends to pull the hub 3 away from the axle, which reduces the press fit of the hub 3 on the axle and can cause the disc to spin on the axle.

Referring to FIGS. 3 and 4, a further conventional design utilizes a brake disc 6 having a flange 7 to attach the friction ring 8 to the hub 9. This brake disc 6 is a two-piece casting with different materials being used for the friction ring 8 than the connecting flange/hub 7, 9, which presents certain problems during manufacturing of the brake disc 6.

United States Patent Application Publication Nos. 2004/0124045 and 2007/0181389 generally disclose brake discs having spokes connecting the hub to the friction ring and are hereby incorporated by reference in their entirety.

SUMMARY OF THE INVENTION

The railway vehicle brake disc described in detail herein comprises a cylindrical hub, a friction ring, and a bell-shaped flange connecting the hub with the friction ring. The cylindrical hub defines a central axis and has an axial width and an outer diameter. The surface at the outer diameter defines an outer hub periphery. The friction ring includes two opposed annular members each having an outer braking surface and an inner surface. The annular members are connected to each other by a plurality of fins extending from the inner surface of one annular member to the inner surface of the other annular member. The bell-shaped flange has an inner portion connected to the hub, an outer portion connected to the fins, and a radial portion connecting the inner portion to the outer portion. The hub, friction ring, and bell-shaped flange are formed integrally from a single material such that the brake disc is a monoblock brake disc.

The hub has a first axial end and a second axial end defining the axial width and the inner portion of the bell-shaped flange may be connected to the hub at the first axial end. The inner portion may also extend radially outward from the first axial end in a common plane with the first axial end. Additionally, the inner portion may extend axially past the first axial end. Further, the inner portion may be arcuate-shaped. Moreover, the inner portion may extend radially outward from the outer hub periphery.

The inner portion, outer portion, and radial portion of the bell-shaped flange may further be of generally uniform or generally non-uniform thickness. The radial portion may define an angle with the outer hub periphery or be generally parallel to the outer hub periphery.

In a further embodiment, the railway vehicle brake disc comprises a cylindrical hub, a friction ring, and a bell-shaped flange connecting the hub with the friction ring. The cylindrical hub defines a central axis and has an axial width and an outer diameter. The surface at the outer diameter defines an outer hub periphery. The friction ring includes two opposed annular members each having an outer braking surface and an inner surface. The annular members are connected to each other by a plurality of fins extending from the inner surface of one annular member to the inner surface of the other annular member. The bell-shaped flange has an inner portion connected to the hub, an outer portion connected to one of the two opposed annular members, and a radial portion connecting the inner portion to the outer portion.

In another embodiment, the railway vehicle brake disc comprises a cylindrical hub defining a central axis with the hub having an axial width and an outer diameter. The surface at the outer diameter defines an outer hub periphery. The disc further includes a friction ring comprising two opposed annular members each having an outer braking surface and an inner surface. The annular members are connected to each other by a plurality of fins extending from the inner surface of one annular member to the inner surface of the other annular member. A flange connects the hub with friction ring. The flange comprises an inner portion connected to the hub, an outer portion connected to the fins, and a radial portion connecting the inner portion to the outer portion. The hub comprises a first axial end and a second axial end defining the axial width, and the inner portion of the flange is connected to the hub at a position intermediate the first axial end and the second axial end. The radial portion may be generally C-shaped. The hub, friction ring, and flange may be formed integrally from a single material such that the brake disc comprises a monoblock brake disc.

Further details and advantages will become clear upon reading the following detailed description in conjunction with the accompanying drawings, wherein like parts are designated with like reference numerals and characters throughout.

BRIEF DESCRIPTION OF THE DRAWINGS

FIG. 1 is a front view of a conventional monoblock brake disc.

FIG. 2 is a cross-sectional view of the brake disc shown in FIG. 1.

FIG. 6 is a cross-sectional view of the brake disc shown in FIG. 5.

FIG. 7 is a schematic view of the brake disc shown in FIG. 5 showing a finite element analysis computer model of the brake disc.

FIG. 8 is a schematic view of the brake disc shown in FIG. 5 showing a finite element analysis computer model of the brake disc.

FIG. 9 is a cross-sectional view of a brake disc according to a second embodiment.

FIG. 12 is a cross-sectional view of a brake disc according to a third embodiment.

FIG. 13 is a schematic view of the brake disc shown in FIG. 12 showing a finite element analysis computer model of the brake disc.

FIG. 14 is a schematic view of the brake disc shown in FIG. 12 showing a finite element analysis computer model of the brake disc.

FIG. 15 is a cross-sectional view of a brake disc according to a fourth embodiment.

FIG. 18 is a cross-sectional view of a brake disc according to a fifth embodiment.

FIG. 19 is a schematic view of the brake disc shown in FIG. 18 showing a finite element analysis computer model of the brake disc.

FIG. 20 is a cross-sectional view of a brake disc according to a sixth embodiment.

FIG. 21 is a schematic view of the brake disc shown in FIG. 20 showing a finite element analysis computer model of the brake disc.

FIG. 22 is a cross-sectional view of a brake disc according to a seventh embodiment.

FIG. 24 is a cross-sectional view of a brake disc according to an eighth embodiment.

FIG. 26 is a cross-sectional view of a brake disc according to a ninth embodiment.

FIG. 28 is a cross-sectional view of a brake disc according to a tenth embodiment.

DESCRIPTION OF THE PREFERRED EMBODIMENTS

Figure 4:
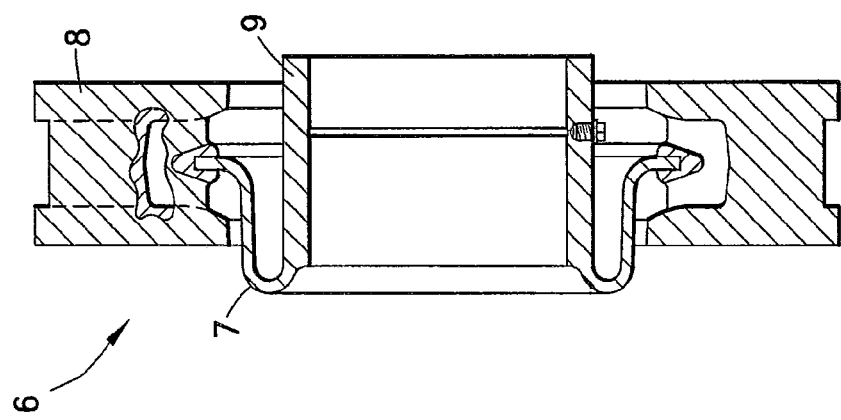
FIG. 4 is a cross-sectional view of the brake disc shown in FIG. 3.
Figure 3:
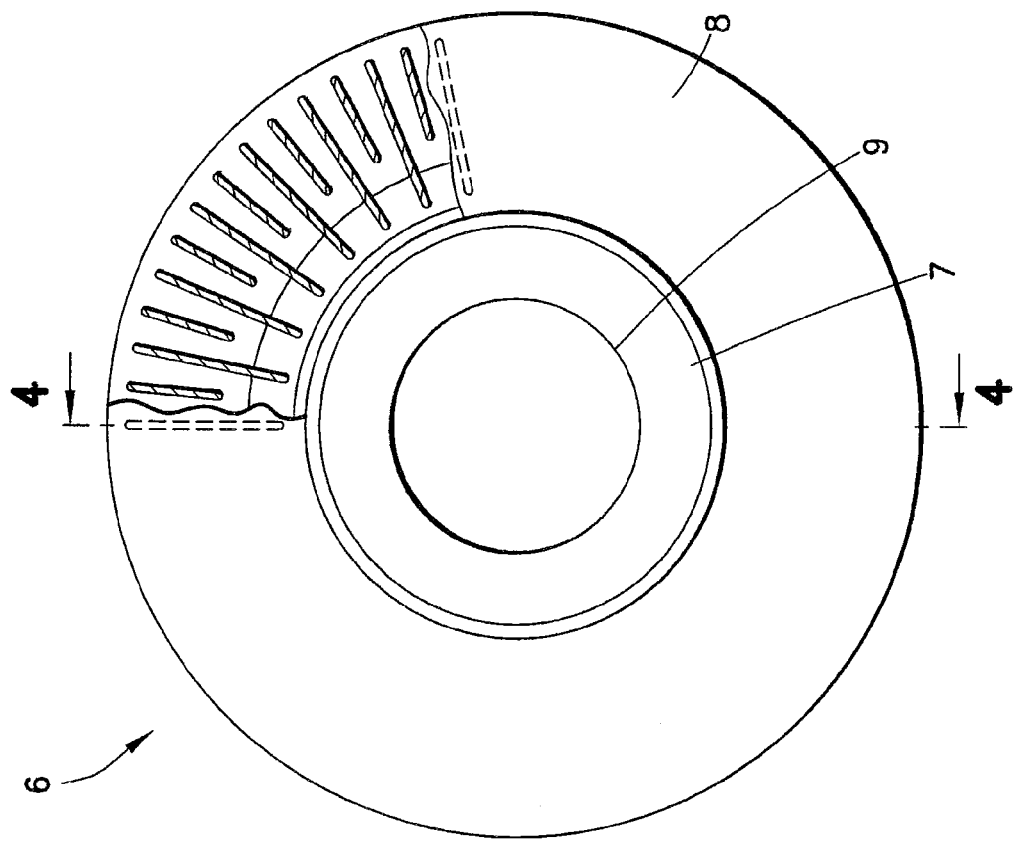
FIG. 3 is a front and partially cut-away view of a further conventional brake disc.
Figure 5:
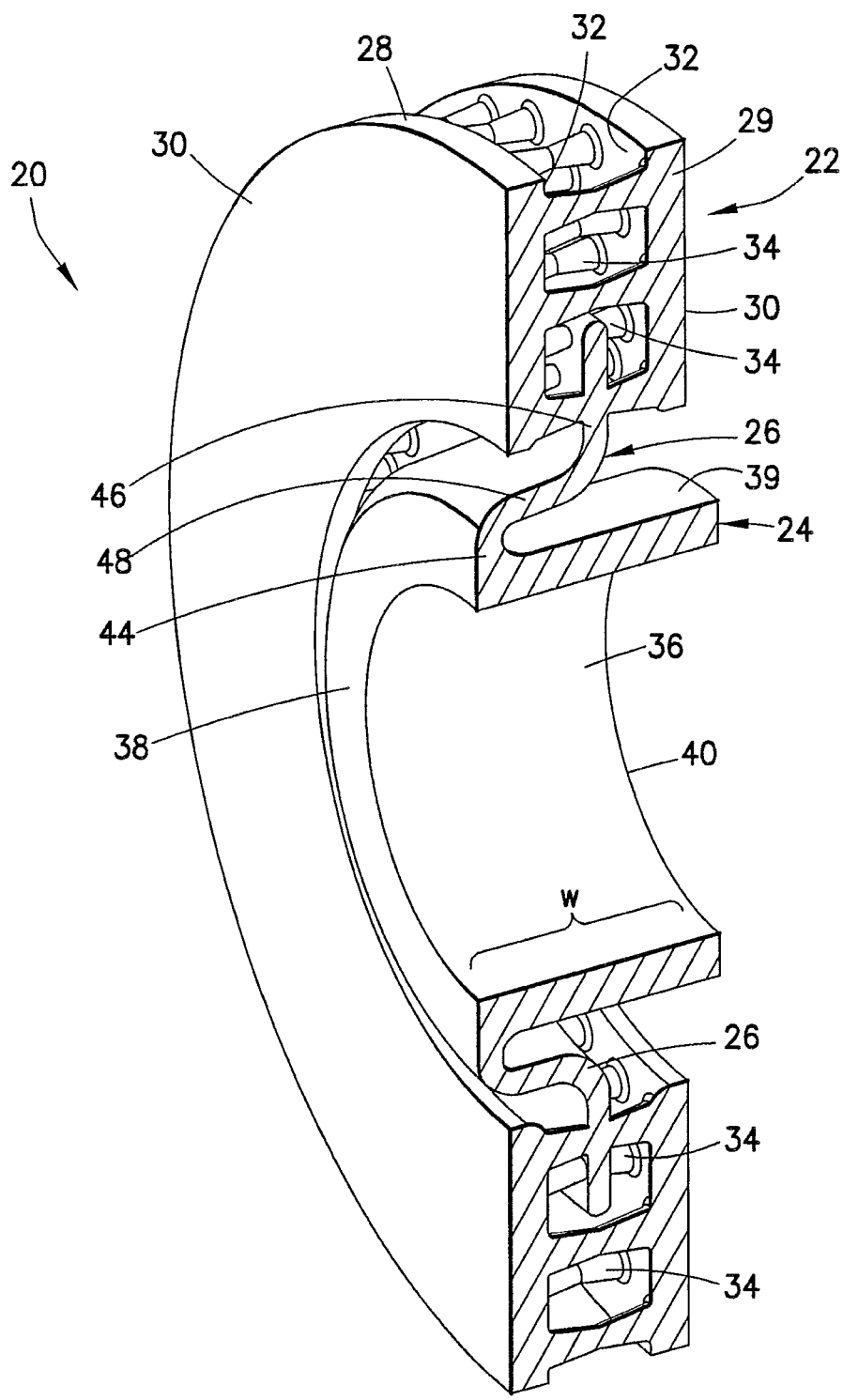
FIG. 5 is a cross-sectional perspective view of a brake disc according to a first embodiment.

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices and components illustrated in the accompanying drawing figures and described herein are simply exemplary and should not be considered as limiting.

Referring to FIGS. 5-8, one embodiment of a brake disc 20 includes a friction ring 22, a hub 24, and a flange 26. In the present embodiment, the friction ring 22, hub 24, and connecting flange 26 are integrally formed so that the brake disc 20 comprises a monoblock brake disc. The friction ring 22 includes two opposed annular members 28, 29 each having an outer braking surface 30 and an inner surface 32. The annular members 28, 29 are connected to each other by a plurality of radially-spaced pin fins 34 extending from the inner surface 32 of one annular member 28 to the inner surface 32 of the other annular member 29, although other suitable fin arrangements, such as radial fins, may be used. The hub 24 includes a cylindrically-shaped body 36 having a first axial end 38 and a second axial end 40. The cylindrical-shaped body 36 comprises an outer surface forming an outer hub periphery or surface 39. The cylindrical-shaped body 36 has an axial width W defined between the first axial end 38 and the second axial end 40. The hub body 36 also defines a central opening 42 configured to receive an axle (not shown) and having a central axis L. The hub 24 may be press-fit onto the axle as is known in the railway vehicle field.

The flange 26 is generally bell-shaped and includes an inner portion 44, an outer portion 46, and a radial portion 48 and connects the friction ring 22 to the hub body 36. In the embodiment of FIGS. 5-8, the inner portion 44 of the flange 26 is connected to the hub body 36 of the hub 24 at the first axial end 38 of the hub body 36 and the flange 26 generally extends to a position approximately midway between the annular members 28, 29 of the friction ring 22. The outer portion 46 of the flange 26 is connected to a plurality of the pin fins 34 to secure the outer portion 46 of the flange 26 to the inner surfaces 32 of the annular members 28, 29. As shown more clearly in FIG. 7, the outer portion 46 of the flange 26 is connected by two rows of pin fins 34 on each side of the flange 26, although the number of pin fins 34 connecting the flange 26 to the friction ring 22 may vary.

As noted, the flange 26 is generally bell-shaped and the radial portion 48 extends between the inner portion 44 and the outer portion 46 of the flange 26. In particular, in the present embodiment, the inner portion 44 of the flange 26 connects to the first end 38 of the hub body 36 and the radial portion 48 extends radially outward at a slight taper or angle relative to the outer hub periphery or surface 39 and then transitions to the outer portion 46. Thus, the radial portion 48 extends radially from the inner portion 44 and transitions to the outer portion 46 and the outer portion 46 transitions to a position laterally between the annular members 28, 29 of the friction ring 22 in the present embodiment. The outer portion 46 of the flange 26 extends from the radial portion 48 for connection to the pin fins 34. Thus, in the present embodiment, the inner portion 44 and the outer portion 46 of the flange 26 are generally straight or generally parallel with one another (as shown in cross-section) with the radial portion 48 extending between the inner and outer portions 44, 46 at a slight taper or angle. The brake disc 20 may be manufactured from a single material, such as steel, as a one-piece casting, although other suitable materials may be used. As depicted in FIGS. 5-8, in the present embodiment, the inner portion 44, outer portion 46, and radial portion 48 generally have a uniform thickness relative to one another, although the inner portion 44, outer portion 46, and radial portion 48 may have a non-uniform thickness as described is certain embodiments discussed below. For instance, the inner portion 44 may have a thinner thickness than the radial portion 48, and the radial portion 48 may have a thinner thickness than the outer portion 46. As shown in FIG. 6, the inner portion 44 of the flange 26 is formed to have an inner or inward facing side thereof in a plane P tangent with or encompassing the first axial end 38 of the hub body 36.

Due to the shape and configuration of the flange 26 relative to the hub 24 and friction ring 22, when the brake disc 20 is undergoing a braking application, the flange 26 is loaded in bending M rather than in tension as the friction ring 22 expands outward and does not transfer all of the force directly to the hub 24, such that the press-fit between the hub 24 and the axle is maintained. In other words, during thermal loading of the friction ring 22, the press-fit of the hub 24 to the axle is maintained by preventing the radially outward expansion of the hub 24. The displacement and stress of the brake disc 20 under loading are shown in FIGS. 7 and 8, respectively, with the different cross-hatching indicating areas of varying displacement or stress. In FIG. 7, as well as the other figures showing displacement discussed below, the brake disc 20 is shown under load in a deformed state and illustrates the flange 26 under the bending moment M. Accordingly, the flange 26 connecting the friction ring 22 to the hub 24 allows the brake disc 20 to handle higher thermal loading while still maintaining the press fit. In a conventional monoblock brake disc, the friction ring pulls directly on the spokes thereby pulling the hub away from the axle and relieving the press fit. During the operation of the brake disc 20, the radial expansion of the friction ring 22 acts to bend or "straighten" the flange 26 such that only a portion of the radial expansion of the friction ring 22 is transferred to the hub 24.

Figure 10:
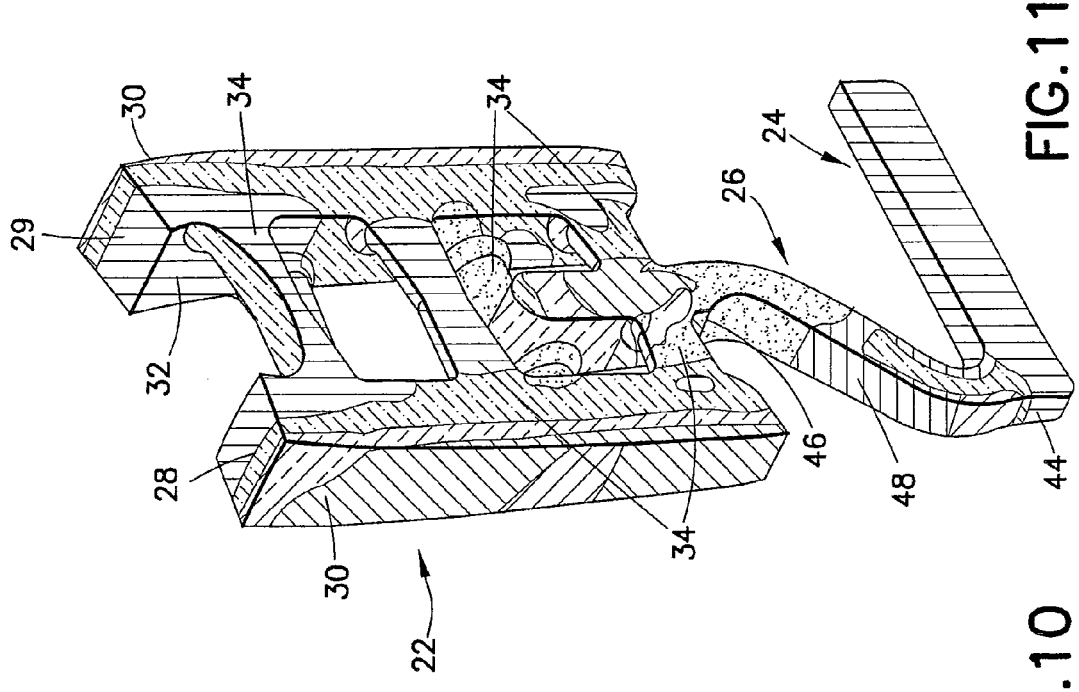
FIG. 10 is a schematic view of the brake disc shown in FIG. 9 showing a finite element analysis computer model of the brake disc.
Figure 11:
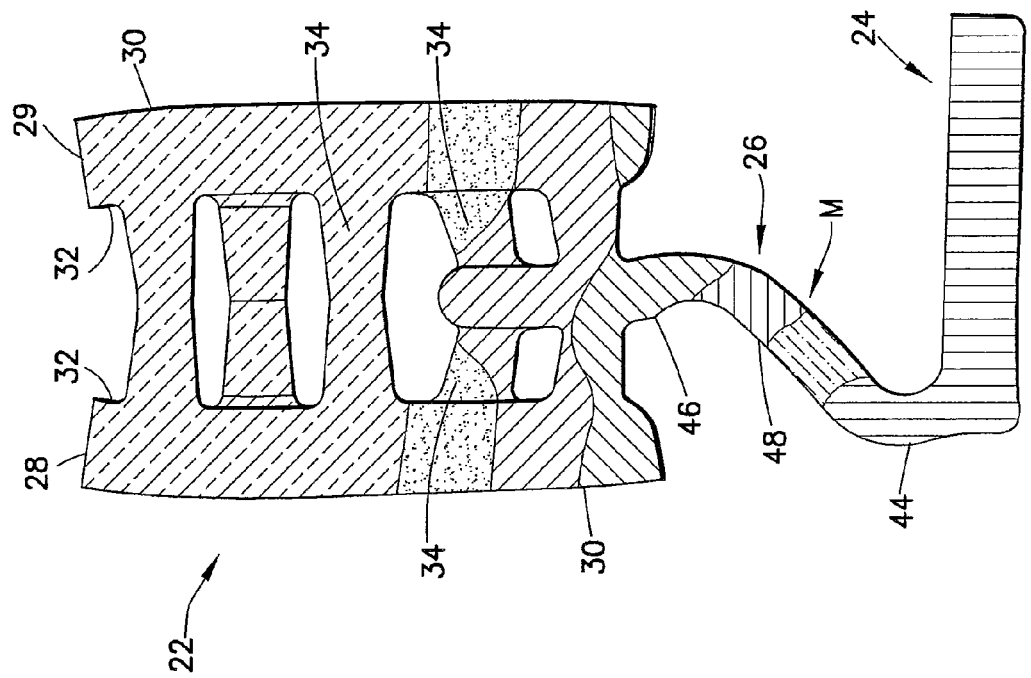
FIG. 11 is a schematic view of the brake disc shown in FIG. 9 showing a finite element analysis computer model of the brake disc.

Referring to FIGS. 9-11, a further embodiment of a brake disc 20*a* is disclosed. The brake disc 20*a* of the present embodiment is similar to the brake disc 20 shown in FIGS. 5-8, but includes a reduced thickness radial portion 48. As depicted in FIGS. 9-11, in the present embodiment, the inner portion 44, outer portion 46, and radial portion 48 have a non-uniform thickness, with the inner portion 44 having a greater thickness than the radial portion 48, and the radial portion 48 having a smaller thickness than the outer portion 46. Moreover, as shown in FIG. 9, the inner portion 44 of the flange 26 is formed to have an inner or inward facing side thereof to lie in a common plane P tangent with or encompassing the first axial end 38 of the hub body 36. The displacement and stress of the brake disc 20*a* under loading are shown in FIGS. 10 and 11, respectively, with the different cross-hatching indicating areas of varying displacement or stress.

Referring to FIGS. 12-14, another embodiment of a brake disc 20*b* is disclosed. The brake disc 20*b* of the present embodiment is similar to the brake disc 20 shown in FIGS. 5-8, except for the connection of the outer portion 46 of the flange 26 to the friction ring 22. In particular, the outer portion 46 of the flange 26 is connected to the inner surface 32 of one annular member 28 by a single row of pin fins 34 and to the inner surface 32 of the other annular member 29 by two rows of pin fins 34. Additionally, the flange 26 has a substantially uniform thickness from the outer portion 46 to inner portion 44 and through the radial portion 48. The radial portion 48 tapers outwardly to the outer portion 46 at a slight angle relative to the outer hub periphery 39 of the hub body 36 of the hub 24. The displacement and stress of the brake disc 20*b* under loading are shown in FIGS. 13 and 14, respectively, with the different cross-hatching indicating areas of varying displacement or stress.

Figure 16:
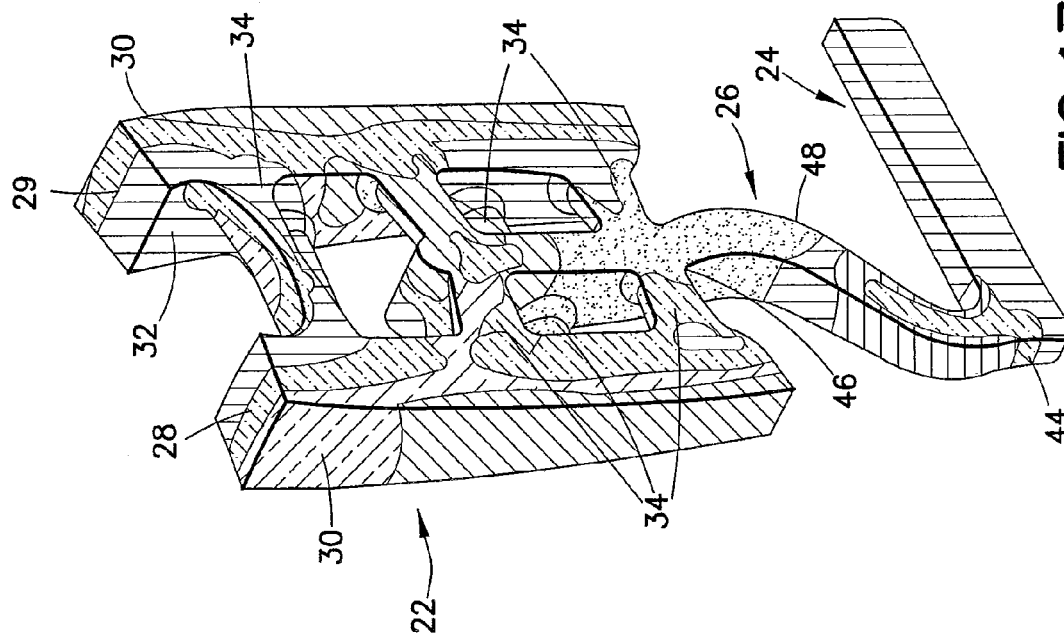
FIG. 16 is a schematic view of the brake disc shown in FIG. 15 showing a finite element analysis computer model of the brake disc.
Figure 17:
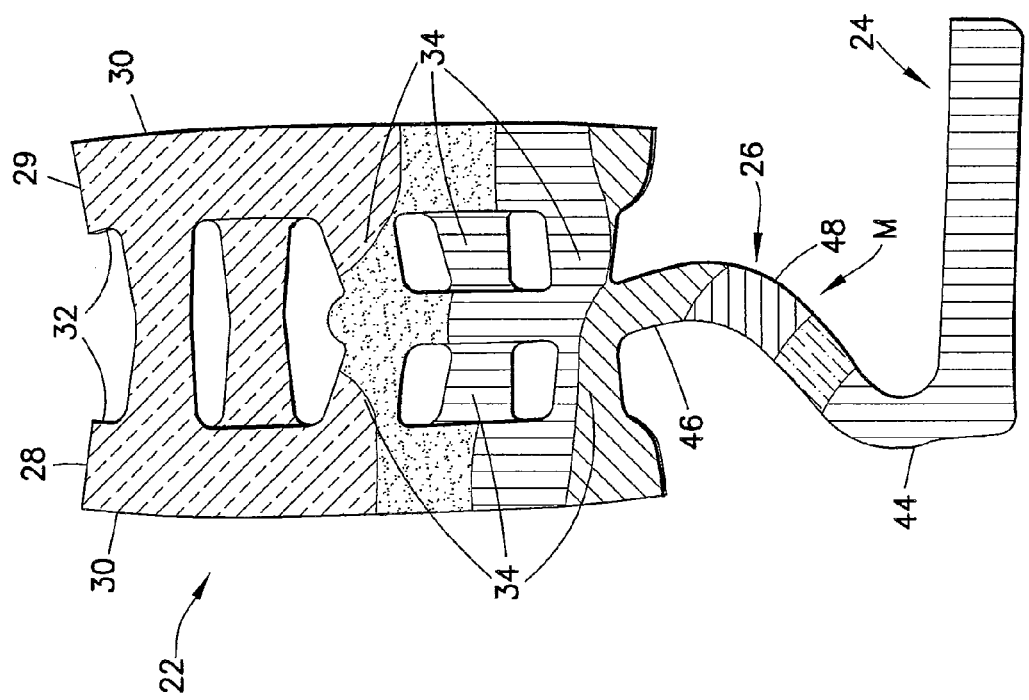
FIG. 17 is a schematic view of the brake disc shown in FIG. 15 showing a finite element analysis computer model of the brake disc.

Referring to FIGS. 15-17, yet another embodiment of a brake disc 20*c* is disclosed. The brake disc 20*c* of the present embodiment is similar to the brake disc 20 shown in FIGS. 5-8, except for the connection of the outer portion 46 of the flange 26 to the friction ring 22. In particular, the outer portion 46 of the flange 26 is connected to the inner surfaces 32 of each annular member 28, 29 by three rows of pin fins 34. Additionally, the flange 26 has a substantially uniform thickness from the outer portion 46 to inner portion 44 and through the radial portion 48. The radial portion 48 extends radially outward at a slight taper or angle relative to the outer hub periphery 39 of the hub body 36 of the hub 24 as best illustrated in FIG. 15, and the inner portion 44 of the flange 26 is formed to have an inner or inward facing side thereof to lie in a common plane P tangent with or encompassing the first axial end 38 of the hub body 36. The displacement and stress of the brake disc 20*c* under loading are shown in FIGS. 16 and 17, respectively, with the different cross-hatching indicating areas of varying displacement or stress.

Referring to FIGS. 18-19, yet a further embodiment of a brake disc 20*d* is disclosed. The brake disc 20*d* of the present embodiment is similar to the brake disc 20 shown in FIGS. 5-8, but the flange 26 is reduced in overall thickness and exhibits a generally uniform thickness except where the outer portion 46 connects to the radial portion 48 and where the inner portion 44 connects to the hub 24. Additionally, the inner portion 44 extends axially past the first axial end 38 of the hub body 36 and exhibits a generally arcuate shape. The radial portion 48 thereafter is formed to be generally parallel to the outer hub periphery 39 of the hub body 36 of the hub 24 as best illustrated in FIG. 18. The displacement of the brake disc 20*d* under loading is shown in FIG. 19 with the different cross-hatching indicating areas of varying displacement.

Referring to FIGS. 20-21, an alternative embodiment of a brake disc 20*e* is disclosed. The brake disc 20*e* of the present embodiment is similar to the brake disc 20 shown in FIGS. 5-8, but the flange 26 has a substantially uniform thickness from the outer portion 46 to the inner portion 44 and through the radial portion 48. The radial portion 48 extends radially outward at a slight taper or angle relative to the outer hub periphery 39 of the hub body 36 of the hub 24 as best illustrated in FIG. 20 and the inner portion 44 of the flange 26 is formed to have an inner or inward facing side thereof to lie in a common plane P tangent with or encompassing the first axial end 38 of the hub body 36. The displacement of the brake disc 20*e* under loading is shown in FIG. 21 with the different cross-hatching indicating areas of varying displacement.

Figure 23:
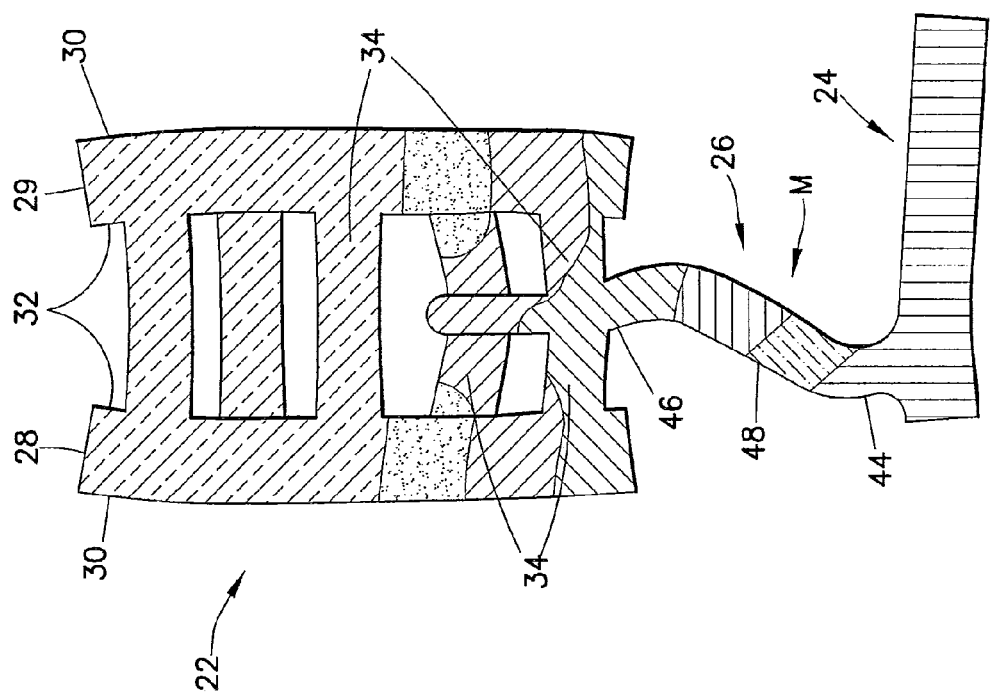
FIG. 23 is a schematic view of the brake disc shown in FIG. 22 showing a finite element analysis computer model of the brake disc.

Referring to FIGS. 22-23, a further alternative embodiment of a brake disc 20*f* is disclosed. The brake disc 20*f* of the present embodiment is similar to the brake disc 20 shown in FIGS. 5-8, expect that the flange 26 is connected to the hub 24 at a position axially spaced from the first axial end 38 of the hub body 36 of the hub 24 and extends outward from the outer hub periphery 39 of the hub body 36. In particular, the radial portion 48 tapers outwardly to the outer portion 46 at a slight angle relative to the outer hub periphery 39 of the hub body 36 of the hub 24. Additionally, the flange 26 has a substantially uniform thickness from the outer portion 46 to the inner portion 44 and through the radial portion 48. The displacement of the brake disc 20*f* under loading is shown in FIG. 23 with the different cross-hatching indicating areas of varying displacement.

Figure 25:
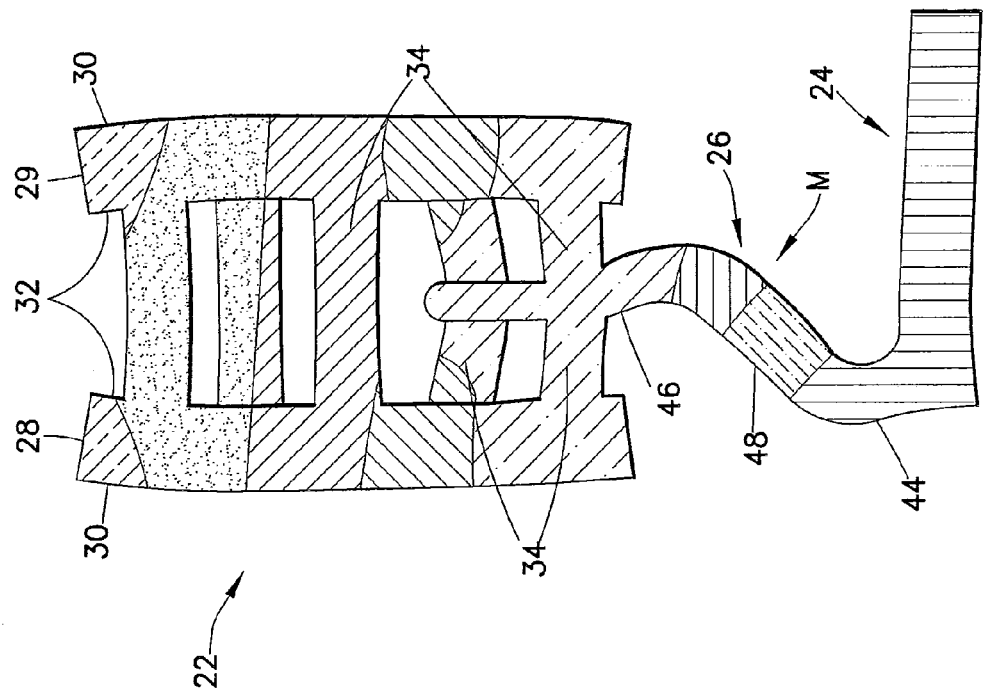
FIG. 25 is a schematic view of the brake disc shown in FIG. 24 showing a finite element analysis computer model of the brake disc.

Referring to FIGS. 24-25, a further embodiment of a brake disc 20g is disclosed. The brake disc 20g of the present embodiment is similar to the brake disc 20 shown in FIGS. 5-8, but the flange 26 includes a thicker radial portion 48 that narrows to the outer portion 46. Further, the radial portion 48 tapers outwardly to the outer portion 46 at a slight angle relative to the outer hub periphery 39 of the hub body 36 of the hub 24, and the inner portion 44 of the flange 26 is formed to have an inner or inward facing side thereof to lie in a common plane P tangent with or encompassing the first axial end 38 of the hub body 36. The displacement of the brake disc 20g under loading is shown in FIG. 25 with the different cross-hatching indicating areas of varying displacement.

Figure 27:
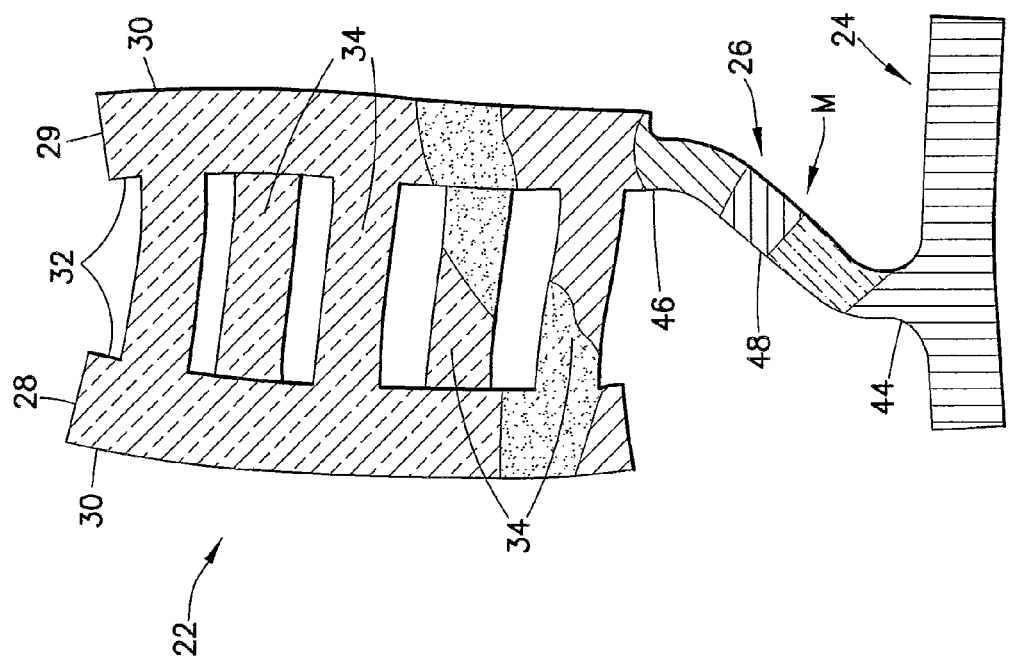
FIG. 27 is a schematic view of the brake disc shown in FIG. 26 showing a finite element analysis computer model of the brake disc.

Referring to FIGS. 26-27, another embodiment of a brake disc 20h is disclosed. The brake disc 20h of the present embodiment is similar to the brake disc 20 shown in FIGS. 5-8 and FIGS. 22-23, expect the flange 26 is connected to the annular member 28 of the friction ring 22 rather than being connected to the pin fins 34. The flange 26 may also be connected to the other annular member 29. Further, the flange 26 is connected to the hub 24 at a position axially spaced from the first axial end 38 of the hub body 36 of the hub 24 and tapers at an angle toward annular member 28 and extends outward from the outer hub periphery 39 of the hub body 36. In particular, the radial portion 48 tapers outwardly to the outer portion 46 at a slight angle relative to the outer hub periphery 39 of the hub body 36 of the hub 24. The flange 26 has a substantially uniform thickness from the outer portion 46 to the inner portion 44 and through the radial portion 48. The displacement of the brake disc 20h under loading is shown in FIG. 27 with the different cross-hatching indicating areas of varying displacement.

Figure 29:
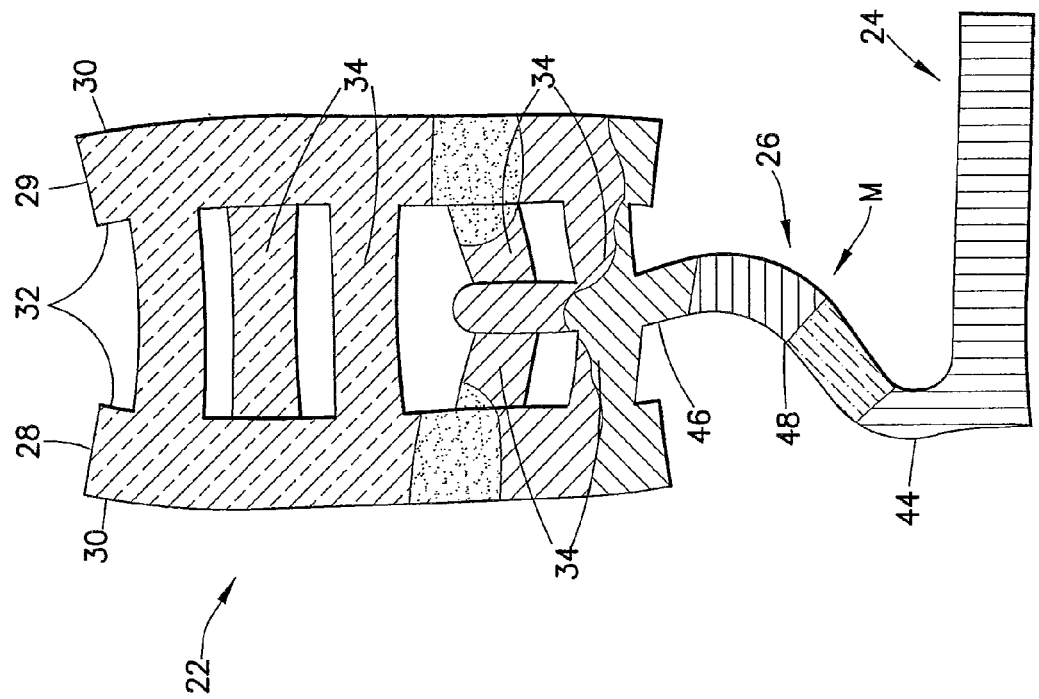
FIG. 29 is a schematic view of the brake disc shown in FIG. 28 showing a finite element analysis computer model of the brake disc.

Referring to FIGS. 28-29, yet another embodiment of a brake disc 20i is disclosed. The brake disc 20i of the present embodiment is similar to the brake disc 20 shown in FIGS. 5-8, but the flange 26 has a substantially uniform thickness from the outer portion 46 to the inner portion 44 and through the radial portion 48. The radial portion 48 extends generally parallel to the outer hub periphery 39 of the hub body 36 of the hub 24 as best illustrated in FIG. 28 and the inner portion 44 of the flange 26 is formed to have an inner or inward facing side thereof to lie in a common plane P tangent with or encompassing the first axial end 38 of the hub body 36. The displacement of the brake disc 20i under loading is shown in FIG. 29 with the different cross-hatching indicating areas of varying displacement.

Figure 30:
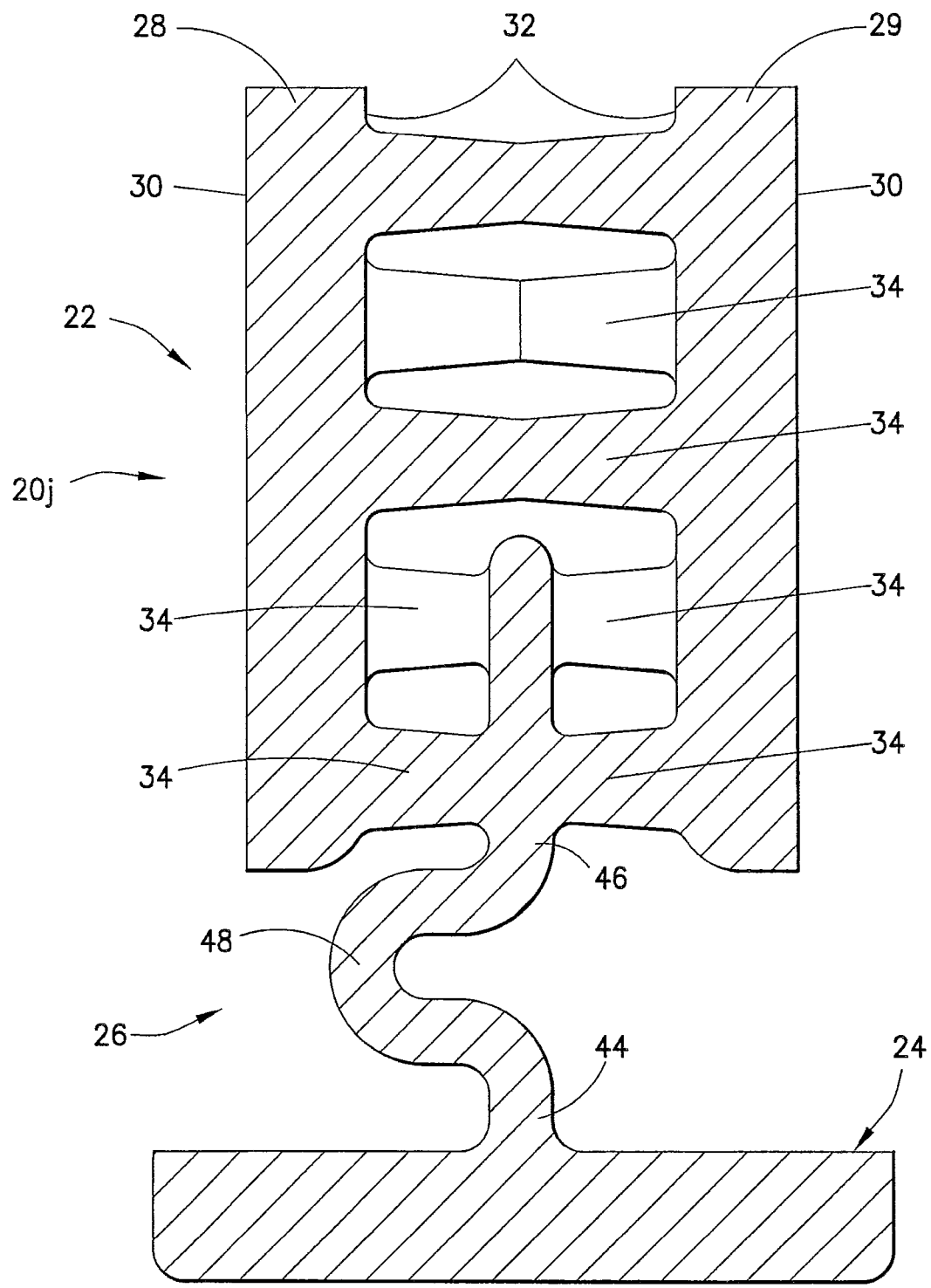
FIG. 30 is a cross-sectional view of a brake disc according to an eleventh embodiment.

Referring to FIG. 30, a further embodiment of a brake disc 20j is disclosed. The brake disc 20j of the present embodiment is similar to the brake disc 20 shown in FIG. 5-8. The flange 26 of the brake disc 20j, however, generally extends from a middle portion of the hub 24, i.e., between the axial ends of the hub 24. More specifically, the inner portion 44 of the flange 26 generally extends perpendicularly from the midpoint of the hub 24. A generally C-shaped radial portion 48 transitions from the inner portion 48 and then transitions to the outer portion 46, which extends to a position laterally between the annular members 28, 29 of the friction ring 22. Thus, the inner portion 44 and the outer portion 46 are generally aligned with each other (as shown in cross-section) in a direction that extends perpendicularly and radially outward from the hub 24 with the C-shaped radial portion 48 extending between the inner and outer portion 44, 46.

While embodiments of a railway vehicle brake disc were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A railway vehicle brake disc, comprising:
   a cylindrical hub defining a central axis, the hub having an axial width and an outer diameter, the surface at the outer diameter defining an outer hub periphery;
   a friction ring comprising two opposed annular members each having an outer braking surface and an inner surface, the annular members connected to each other by a plurality of individual fins extending transversely from the inner surface of one annular member to the inner surface of the other annular member;
   a bell-shaped flange connecting the hub with the friction ring, the bell-shaped flange comprising an inner portion connected to the hub, an outer portion directly connected to the individual fins disposed radially closest to the cylindrical hub, and a radial portion connecting the inner portion to the outer portion;
   wherein the hub, friction ring, and bell-shaped flange are formed integrally from a single material such that the brake disc comprises a monoblock brake disc; and
   wherein the plurality of individual fins comprise a plurality of pin fins.

2. A railway vehicle brake disc as claimed in claim 1, wherein the hub comprises a first axial end and a second axial end defining the axial width, and wherein the inner portion of the bell-shaped flange is connected to the hub at the first axial end of the hub.

3. A railway vehicle brake disc as claimed in claim 2, wherein the inner portion of the bell-shaped flange extends outward from the first axial end in a common plane with the first axial end of the hub.

4. A railway vehicle brake disc as claimed in claim 2, wherein the inner portion of the bell-shaped flange extends axially past the first axial end of the hub.

5. A railway vehicle brake disc as claimed in claim 4, wherein the inner portion of the bell-shaped flange is arcuate-shaped.

6. A railway vehicle brake disc as claimed in claim 1, wherein the inner portion of the bell-shaped flange extends outward from the outer hub periphery.

7. A railway vehicle brake disc as claimed in claim 1, wherein the inner portion, outer portion, and radial portion of the bell-shaped flange are of uniform thickness.

8. A railway vehicle brake disc as claimed in claim 1, wherein the inner portion, outer portion, and radial portion of the bell-shaped flange are of non-uniform thickness.

9. A railway vehicle brake disc as claimed in claim 1, wherein the radial portion of the bell-shaped flange defines an angle with the outer hub periphery.

10. A railway vehicle brake disc as claimed in claim 1, wherein the radial portion of the bell-shaped flange is generally parallel to the outer hub periphery.

11. A railway vehicle brake disc, comprising:
    a cylindrical hub defining a central axis, the hub having an axial width and an outer diameter, the surface at the outer diameter defining an outer hub periphery;
    a friction ring comprising two opposed annular members each having an outer braking surface and an inner surface, the annular members connected to each other by a plurality of individual fins extending transversely from the inner surface of one annular member to the inner surface of the other annular member;

a bell-shaped flange connecting the hub with the friction ring, the bell-shaped flange comprising an inner portion connected to the hub, an outer portion directly connected to the individual fins disposed radially closest to the cylindrical hub of one of the two opposed annular members, and a radial portion connecting the inner portion to the outer portion, wherein the hub comprises a first axial end and a second axial end defining the axial width, and wherein the inner portion of the bell-shaped flange is connected to the hub at a position intermediate the first axial end and the second axial end;

wherein the hub, friction ring, and bell-shaped flange are formed integrally from a single material such that the brake disc comprises a monoblock brake disc; and wherein the plurality of individual fins comprise a plurality of pin fins.

12. A railway vehicle brake disc as claimed in claim 1, wherein the plurality of individual fins comprise a plurality of cooling pin fins.

13. A railway vehicle brake disc as claimed in claim 11, wherein the inner portion of the bell-shaped flange extends outward from the outer hub periphery.

14. A railway vehicle brake disc as claimed in claim 11, wherein the inner portion, outer portion, and radial portion of the bell-shaped flange are of uniform thickness.

15. A railway vehicle brake disc as claimed in claim 11, wherein the inner portion, outer portion, and radial portion of the bell-shaped flange are of non-uniform thickness.

16. A railway vehicle brake disc as claimed in claim 11, wherein the radial portion of the bell-shaped flange defines an angle with the outer hub periphery.

17. A railway vehicle brake disc as claimed in claim 11, wherein the plurality of individual fins comprise a plurality of cooling pin fins.

18. A railway vehicle brake disc, comprising:
a cylindrical hub defining a central axis, the hub having an axial width and an outer diameter, the surface at the outer diameter defining an outer hub periphery;
a friction ring comprising two opposed annular members each having an outer braking surface and an inner surface, the annular members connected to each other by a plurality of individual fins extending transversely from the inner surface of one annular member to the inner surface of the other annular member; and
a flange connecting the hub with the friction ring, the flange comprising an inner portion connected to the hub, an outer portion directly connected to the individual fins disposed radially closest to the cylindrical hub, and a radial portion connecting the inner portion to the outer portion;
wherein the hub comprises a first axial end and a second axial end defining the axial width, and wherein the inner portion of the flange is connected to the hub at a position intermediate the first axial end and the second axial end;
wherein the hub, friction ring, and flange are formed integrally from a single material such that the brake disc comprises a monoblock brake disc; and
wherein the plurality of individual fins comprise a plurality of pin fins.

19. A railway vehicle brake disc as claimed in claim 18, wherein the radial portion is generally C-shaped.

20. A railway vehicle brake disc as claimed in claim 18, wherein the plurality of individual fins comprise a plurality of cooling pin fins.

* * * * *